United States Patent
Takahashi et al.

(10) Patent No.: US 11,802,782 B2
(45) Date of Patent: Oct. 31, 2023

(54) ULTRASONIC FLOWMETER WITH A FLOW PATH INNER WALL SURFACE WITH A DRAFT OF A MOLD FOR INTEGRAL MOLDING

(71) Applicant: Panasonic Intellectual Property Management Co., Ltd., Osaka (JP)

(72) Inventors: Yukihide Takahashi, Nara (JP); Hiroshi Nakai, Osaka (JP); Kenji Yasuda, Kyoto (JP); Takashi Kayaba, Kyoto (JP); Yuki Anan, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 324 days.

(21) Appl. No.: 17/258,721

(22) PCT Filed: Jul. 25, 2019

(86) PCT No.: PCT/JP2019/029127
§ 371 (c)(1),
(2) Date: Jan. 7, 2021

(87) PCT Pub. No.: WO2020/044887
PCT Pub. Date: Mar. 5, 2020

(65) Prior Publication Data
US 2021/0270650 A1    Sep. 2, 2021

(30) Foreign Application Priority Data
Aug. 31, 2018   (JP) .................................. 2018-162224

(51) Int. Cl.
*G01F 1/66* (2022.01)
*G01F 1/667* (2022.01)

(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS 4,923,598 A * 5/1990 Schal .................. A61M 1/3403
210/90
2012/0266691 A1* 10/2012 Satou ...................... G01F 1/662
73/861.28

(Continued)

FOREIGN PATENT DOCUMENTS

EP     2 505 969      10/2012
JP     2011-112377    6/2011

(Continued)

OTHER PUBLICATIONS

Extended European Search Report dated Sep. 16, 2021 for related European Patent Application No. 19855004.8.

(Continued)

*Primary Examiner* — Harshad R Patel
(74) *Attorney, Agent, or Firm* — Wenderoth, Lind & Ponack, L.L.P.

(57) ABSTRACT

An ultrasonic flowmeter includes a measurement flow path and a pair of ultrasonic sensors arranged upstream and downstream on a first surface of the measurement flow path. In addition, the ultrasonic flowmeter includes a flow rate calculator that detects a flow rate of a fluid to be measured based on a propagation time until ultrasonic signals transmitted from one of the ultrasonic sensors propagate with one or more reflections on a second surface of the measurement flow path facing the first surface, and are received by the other one of the ultrasonic sensors. Furthermore, the measurement flow path has an inner wall surface provided with (Continued)

a draft of a mold for integral molding, and the ultrasonic sensors are fixed to the measurement flow path, incident angles of ultrasonic signals transmitted from the ultrasonic sensors on reflection surface of the second surface where the ultrasonic signals are reflected being equal.

8 Claims, 7 Drawing Sheets

(56) References Cited

U.S. PATENT DOCUMENTS

| | | | |
|---|---|---|---|
| 2012/0272750 A1 | 11/2012 | Fujii et al. | |
| 2013/0032152 A1* | 2/2013 | Reuterholt | G01F 1/662 128/205.23 |
| 2013/0192457 A1* | 8/2013 | Ashiba | F16F 9/3484 92/169.1 |
| 2013/0312537 A1* | 11/2013 | Miyata | G01F 1/662 73/861.28 |
| 2014/0174561 A1 | 6/2014 | Hagihara et al. | |
| 2015/0143919 A1* | 5/2015 | Nakano | G01F 1/662 73/861.28 |
| 2016/0377468 A1* | 12/2016 | Satou | G01F 1/662 73/861.27 |

FOREIGN PATENT DOCUMENTS

| | | |
|---|---|---|
| JP | 2011-127948 | 6/2011 |
| JP | 2014-215060 | 11/2014 |

OTHER PUBLICATIONS

International Search Report of PCT application No. PCT/JP2019/029127 dated Oct. 1, 2019.

* cited by examiner

ULTRASONIC FLOWMETER WITH A FLOW PATH INNER WALL SURFACE WITH A DRAFT OF A MOLD FOR INTEGRAL MOLDING

CROSS-REFERENCE TO RELATED APPLICATIONS

This application is a U.S. national stage application of the PCT International Application No. PCT/JP2019/029127 filed on Jul. 25, 2019, which claims the benefit of foreign priority of Japanese patent application No. 2018-162224 filed on Aug. 31, 2018, the contents all of which are incorporated herein by reference.

TECHNICAL FIELD

The present disclosure relates to an ultrasonic flowmeter that includes a measurement flow path and measures a flow rate by utilizing a propagation time of ultrasonic waves.

BACKGROUND ART

An example of a conventional ultrasonic flowmeter of this type is illustrated in FIG. 7. FIG. 7 is a configuration diagram of the conventional ultrasonic flowmeter described in PTL 1. In the ultrasonic flowmeter illustrated in FIG. 7, measurement flow path 101, partition plate 102, and entrainment flow suppression sheet 103 are made as separate components. Measurement flow path 101 includes component insertion port 106, and partition plate 102 and entrainment flow suppression sheet 103 are inserted into measurement flow path 101 from insertion port 106 at a predetermined angle. Ultrasonic sensor mounting block 104 is then fixed to measurement flow path 101 by a method such as welding, and a pair of ultrasonic sensors 105a, 105b are mounted on ultrasonic sensor mounting block 104. In this state, the ultrasonic flowmeter is configured so that a fluid to be measured does not leak from component insertion port 106.

Ultrasonic signals transmitted from one ultrasonic sensor 105a are reflected on a bottom surface of measurement flow path 101 and propagate to other ultrasonic sensor 105b, and a flow rate of the fluid to be measured is calculated based on a propagation time of the ultrasonic signals.

FIG. 8 illustrates a mold configuration of the measurement flow path of the conventional ultrasonic flowmeter. As illustrated in FIG. 8, mold 109a is pulled out from component insertion port 106, mold 109b is pulled out from measurement flow path inlet 107 of measurement flow path 101, and mold 109c is pulled out from measurement flow path outlet 108 of measurement flow path 101, so that measurement flow path 101 is molded. As described above, a region where ultrasonic sensors 105a, 105b measure the flow rate of the fluid to be measured is a region molded by mold 109a, and bottom surface 101a of measurement flow path 101 where the ultrasonic signals are reflected does not have a draft.

Furthermore, incident angles of ultrasonic waves transmitted from ultrasonic sensors 105a, 105b on bottom surface 101a of measurement flow path 101 are equal. As a result, a phase of a received waveform at each position on radiation surfaces of the ultrasonic sensors is matched with each other, the received waveform is stable, and the flow rate can be measured with high accuracy.

CITATION LIST

Patent Literature

PTL 1: Unexamined Japanese Patent Publication No. 2014-215060

SUMMARY OF THE INVENTION

However, in the conventional configuration, there is a problem that, since partition plate 102, entrainment flow suppression sheet 103, and ultrasonic sensor mounting block 104 to be mounted on measurement flow path 101 are separate components, the number of components increases, and costs increase due to material costs and assembly man-hours. Therefore, it is conceivable to reduce the number of components to reduce the costs by integrally molding a plurality of components into one.

An example of the integral molding is illustrated in FIG. 9. FIG. 9 is a perspective view of measurement flow path 201 in which partition plate 102, entrainment flow suppression sheet 103, and ultrasonic sensor mounting block 104 of measurement flow path 101, which are illustrated in FIG. 7, are integrally molded.

However, when measurement flow path 201 is molded with a resin, a draft is required in a measurement portion of the ultrasonic signals in order to pull out molds from measurement flow path inlet 207 and measurement flow path outlet 208. In addition, a parting line is provided at a contact part of the molds on a side of measurement flow path inlet 207 and a side of measurement flow path outlet 208, and a position of the parting line is determined by the depth of penetration of the molds into the flow path. The draft and the parting line may cause an error in flow rate measurement depending on a way of providing the draft and the parting line.

Therefore, the way of providing the draft and the parting line of the molds, which may cause an error in the flow rate measurement, will be described with reference to FIGS. 10, 11, and 12.

FIG. 10 is a cross-sectional view of measurement flow path 201 having a gradient on a bottom surface in an integrally-molded measurement flow path of a conventional ultrasonic flowmeter. FIG. 11 is a cross-sectional view of measurement flow path 301 having a gradient on an upper surface in an integrally-molded measurement flow path of a conventional ultrasonic flowmeter. FIG. 12 is a cross-sectional view of measurement flow path 401 having a parting line on a reflection surface of the ultrasonic signals in an integrally-molded measurement flow path of a conventional ultrasonic flowmeter.

In the measurement flow path illustrated in FIG. 10, when a reflection angle and a draft in a case where there is no gradient on reflection surface 212 of the ultrasonic waves in measurement flow path 201 are θ and α, respectively, angle θ1 formed by a radiation direction of ultrasonic signals from ultrasonic sensor 105a and reflection surface 212 is θ+α, and angle θ2 formed by a radiation direction of ultrasonic signals from ultrasonic sensor 105b and reflection surface 212 is θ−α.

As described above, when angles θ1 and θ2 formed by reflection surface 212 of the ultrasonic signals and the radiation direction of ultrasonic sensor 105a are different, ultrasonic signals radiated from two points A, B separated by distance d on radiation surface 209a of ultrasonic sensor 105a have different lengths between propagation paths P201 and P202.

Furthermore, incident angle θ3 of the ultrasonic signals radiated from ultrasonic sensor 105a through propagation paths P201, P202 on radiation surface 209b of ultrasonic sensor 105b is π/2−2α. There is a difference in the propagation path corresponding to an angle of 2α, and propagation path P201 is longer than propagation path P202 by d tan 2α.

Since a received waveform is received as a composite wave of ultrasonic signals radiated from the entire radiation surface, overlapping of ultrasonic signals having different phases due to a slight propagation time difference causes a phase of the received waveform to be unstable. Furthermore, when the ultrasonic signals having different phases overlap with each other, an amplitude of the received waveform is small, which causes the ultrasonic signals to be easily affected by noise. These cause an error in the flow rate measurement.

The ultrasonic signal has a frequency as high as several hundred kHz and a short wavelength, and thus, even a draft of about 0.3° to 0.5° generates a difference in the length between the propagation paths in an equivalent order to the wavelength, and the magnitude of the phase change is also not negligible.

The measurement flow path illustrated in FIG. 11 is a case where reflection surface 312 and surface 311 having openings 203a, 203b are not parallel and surface 311 has a gradient of angle β with respect to reflection surface 312. Even if the entire lengths of propagation paths P203, P204 of ultrasonic signals radiated from radiation surface 209a of ultrasonic sensor 105a are the same, lengths of portions passing through the fluid to be measured, that is, portions illustrated by solid lines in FIG. 11, differ between propagation paths P203, P204.

Therefore, when the fluid to be measured is flowing at flow velocity v, ultrasonic signals radiated from two points A, B separated by distance d on radiation surface 209a of ultrasonic sensor 105a have different distances affected by a flow of the fluid to be measured in the propagation paths, and propagation path P204 is more affected by flow velocity v than propagation path P203.

Since a received waveform is received as a composite wave of ultrasonic signals radiated from the entire radiation surface, ultrasonic signals having different phases overlap with each other, which causes a phase of the received waveform to be unstable. Furthermore, when the ultrasonic signals having different phases overlap with each other, an amplitude of the received waveform is small, which causes the ultrasonic signals to be easily affected by noise. These cause an error in the flow rate measurement.

In the measurement flow path illustrated in FIG. 12, measurement flow path 401 is molded by molds that abut in the center, and parting line 413 is provided on reflection surface 412 of the ultrasonic signals. Due to a burr formed on parting line 413, the ultrasonic signals are diffusely reflected and a shape of a received waveform is unstable. This causes an error in the flow rate measurement.

The present disclosure provides an ultrasonic flowmeter that prevents a received waveform from being unstable due to a draft and a parting line of molds and an error in flow rate measurement from occurring, to measure a flow rate with high accuracy, while material costs and assembly man-hours are reduced by integral molding as compared with a conventional configuration.

An ultrasonic flowmeter of the present disclosure includes a measurement flow path through which a fluid to be measured flows, the measurement flow path including a first surface, a second surface facing the first surface, and a third surface and a fourth surface laid between the first surface and the second surface. In addition, the ultrasonic flowmeter includes a pair of ultrasonic sensors that are arranged on the first surface of the measurement flow path and capable of transmitting and receiving ultrasonic signals, openings that are provided on the first surface for the pair of ultrasonic sensors to transmit and receive the ultrasonic signals, and a flow rate calculator that detects a flow rate of the fluid to be measured based on a propagation time until ultrasonic signals transmitted from one of the pair of ultrasonic sensors propagate through the fluid to be measured with at least one reflection on the second surface of the measurement flow path, and are received by another one of the pair of ultrasonic sensors. Furthermore, the measurement flow path of the ultrasonic flowmeter has an inner wall surface provided with a draft of a mold for integral molding, and the pair of ultrasonic sensors are fixed to the measurement flow path, incident angles of ultrasonic signals transmitted from the pair of the ultrasonic sensors on a reflection surface of the second surface where the ultrasonic signals are reflected being equal.

This configuration prevents the length of a propagation path through which radiated ultrasonic signals pass from changing depending on a position on radiation surfaces of the ultrasonic sensors while reducing material costs and assembly man-hours as compared with a conventional configuration, and a phase of a received waveform at each position on the radiation surfaces of the ultrasonic sensors is matched with each other, so that the received waveform is stable and a flow rate can be measured with high accuracy.

The present invention can provide an ultrasonic flowmeter capable of accurately measuring a flow rate while costs of components conventionally incurred are reduced by integral molding.

DESCRIPTION OF EMBODIMENTS

Hereinafter, exemplary embodiments of the present disclosure will be described with reference to the drawings.

First Exemplary Embodiment

Figure 1:
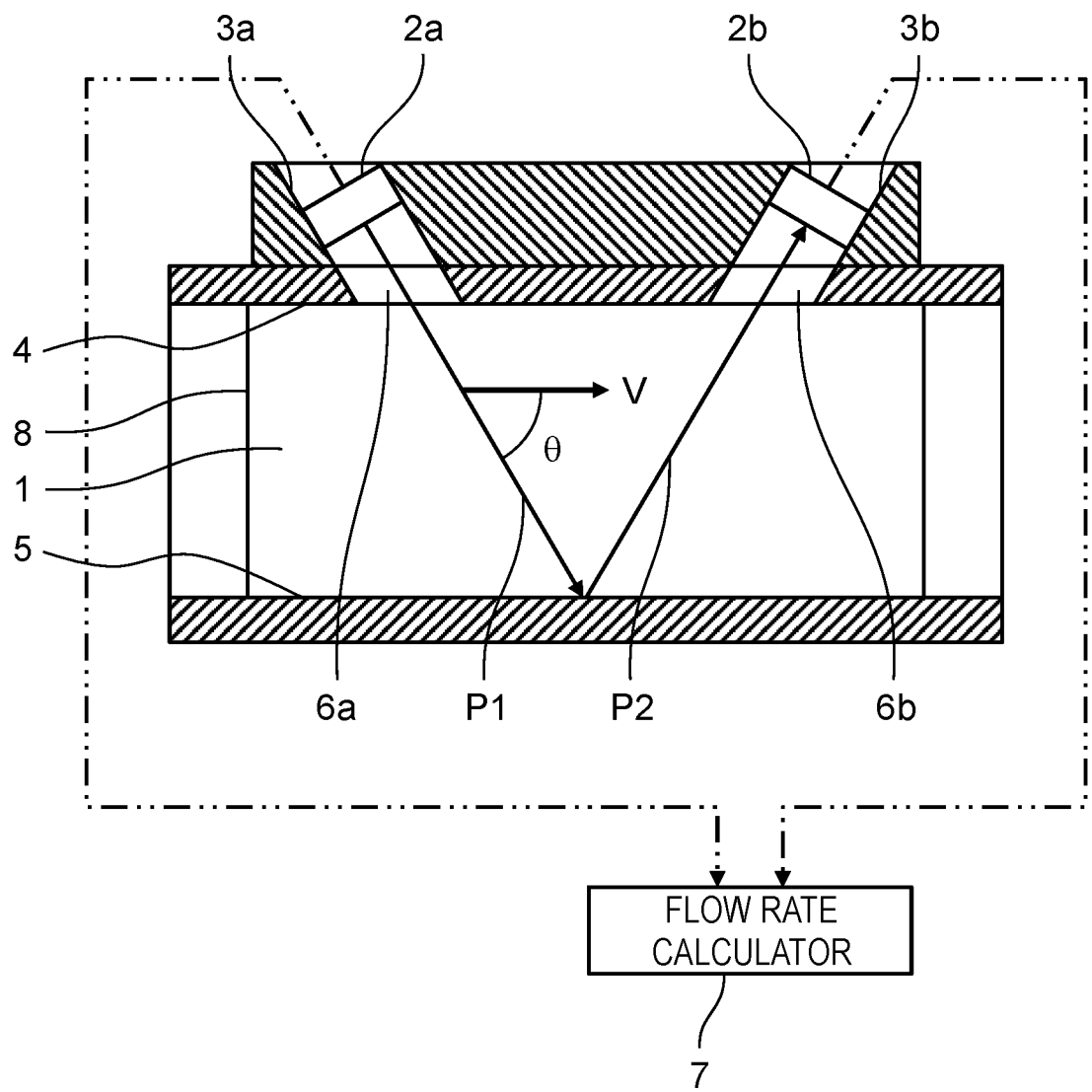
FIG. 1 is a configuration diagram of an ultrasonic flowmeter according to a first exemplary embodiment and a second exemplary embodiment.
Figure 2:
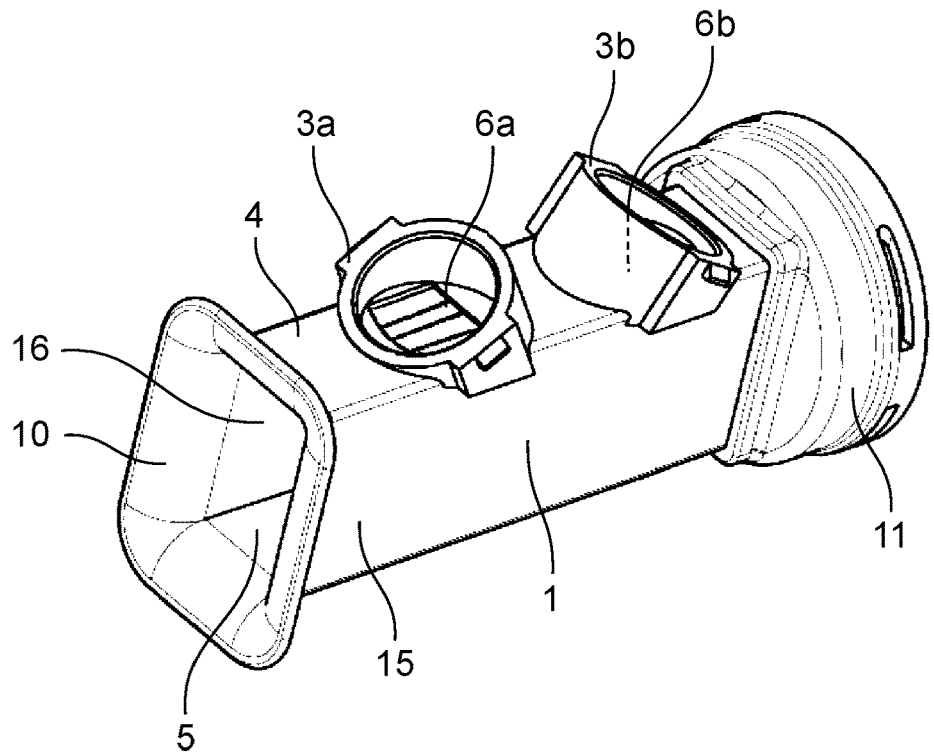
FIG. 2 is a perspective view of a measurement flow path of the ultrasonic flowmeter according to the first exemplary embodiment and the second exemplary embodiment.
Figure 3:
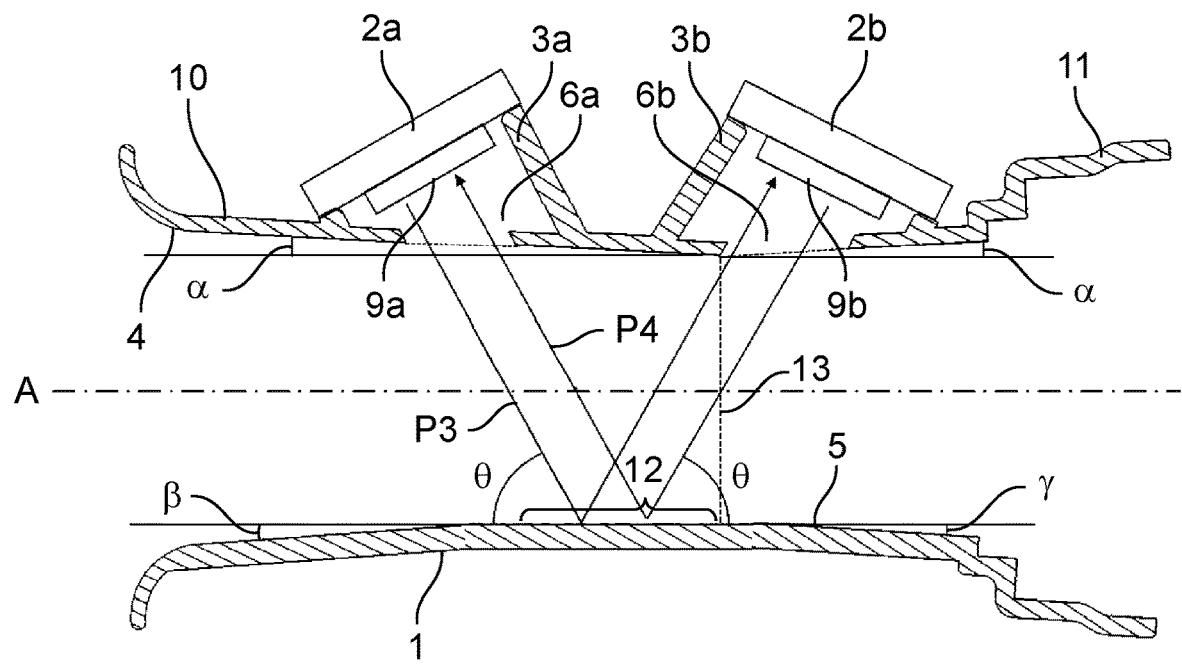
FIG. 3 is a cross-sectional view of main components of an ultrasonic flowmeter according to the first exemplary embodiment.
Figure 4:
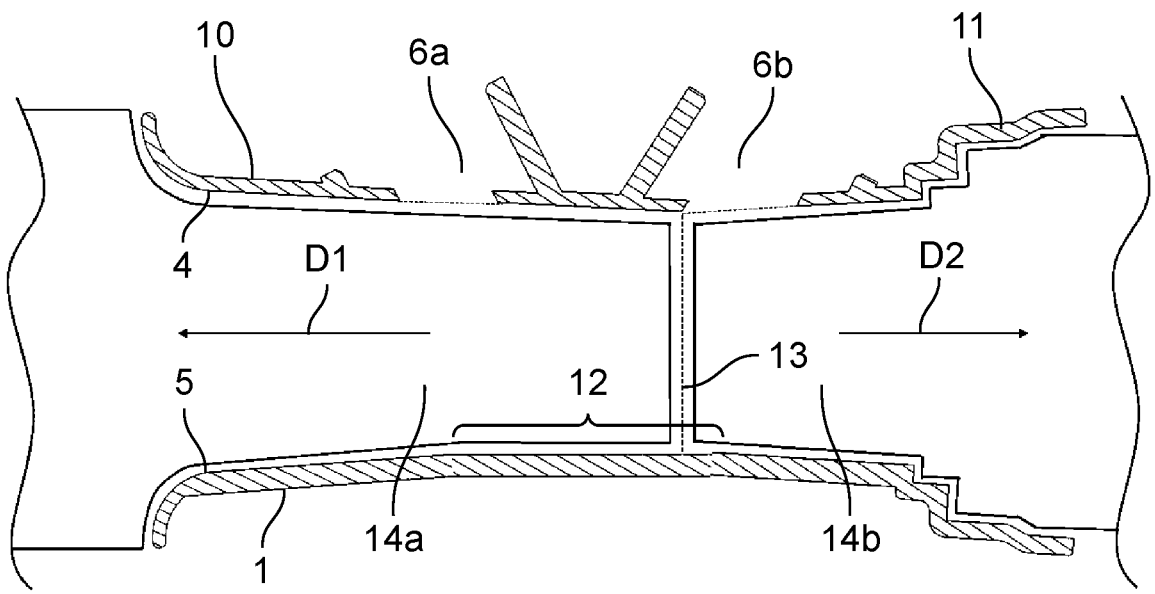
FIG. 4 is a cross-sectional view of a measurement flow path of the ultrasonic flowmeter according to the first exemplary embodiment when molds are inserted.

FIG. 1 is a configuration diagram of an ultrasonic flowmeter according to a first exemplary embodiment. FIG. 2 is a perspective view of a measurement flow path of the ultrasonic flowmeter according to the first exemplary embodiment. FIG. 3 is a cross-sectional view of main components of the measurement flow path of the ultrasonic flowmeter according to the first exemplary embodiment. FIG. 4 is a cross-sectional view of the measurement flow path of the ultrasonic flowmeter according to the first exemplary embodiment when molds are inserted.

Hereinafter, a configuration of the ultrasonic flowmeter according to the present exemplary embodiment will be described with reference to FIGS. 1 and 2.

Measurement flow path 1 through which a fluid to be measured is passed is a pipe having a rectangular cross section. On measurement flow path 1, mounting portions 3a, 3b that fix a pair of ultrasonic sensors 2a, 2b are formed, and measurement flow path 1 is divided into multiple layers by partition plate 8. Measurement flow path 1, mounting portions 3a, 3b, and partition plate 8 are integrally molded. Note that an inner surface of measurement flow path 1 on a side where the pair of ultrasonic sensors 2a, 2b are arranged upstream and downstream of the fluid to be measured is defined as flow path upper surface 4, which is a first surface, a surface facing flow path upper surface 4 is defined as flow path bottom surface 5, which is a second surface, and two surfaces laid between flow path upper surface 4 and flow path bottom surface 5 are defined as side surfaces 15, 16, which are a third surface and a fourth surface.

Ultrasonic signals transmitted from one of the pair of ultrasonic sensors 2a, 2b are reflected on flow path bottom surface 5, which is the second surface, and propagate to the other of the pair of ultrasonic sensors. A propagation time is measured at a timing when a voltage obtained as a received waveform reaches a predetermined voltage, and flow rate calculator 7 calculates a flow rate of the fluid to be measured from the propagation time.

As described above, when angles formed by the pair of ultrasonic sensors 2a, 2b with respect to reflection surface 12 of the ultrasonic signals located on flow path bottom surface 5, which is the second surface, are different, in other words, when the pair of ultrasonic sensors 2a, 2b are fixed to mounting portions 3a, 3b so that incident angles of ultrasonic signals transmitted from the pair of ultrasonic sensors 2a, 2b on reflection surface 12 are different, the following occurs. That is, ultrasonic signals radiated from two points on radiation surface 9a, 9b of the pair of ultrasonic sensors 2a, 2b, which are separated by a distance in a direction parallel to partition plate 8, differ in the length of a propagation path. Since the received waveform is received as a composite wave of ultrasonic signals radiated from entire radiation surface 9a or 9b, ultrasonic signals having different phases overlap with each other, which causes not only a phase of the received waveform to be unstable, but also an amplitude to be small, and as a result, the ultrasonic signals are easily affected by noise. This causes an error in flow rate measurement.

In addition, when either of the combinations of reflection surface 12 and opening 6a or reflection surface 12 and opening 6b is not parallel, opening 6a and opening 6b are parallel, and there is a flow rate of the fluid to be measured, the following occurs. That is, ultrasonic signals radiated from two points on radiation surface 9a, 9b of the pair of ultrasonic sensors 2a, 2b, which are separated by a distance in the direction parallel to partition plate 8, have different distances affected by a flow of the fluid to be measured in the propagation path. Since the received waveform is received as a composite wave of the ultrasonic signals radiated from entire radiation surface 9a or 9b, the ultrasonic signals having different phases overlap with each other, which causes not only the phase of the received waveform to be unstable, but also the amplitude to be small, and as a result, the ultrasonic signals are easily affected by noise. This causes an error in the flow rate measurement.

Furthermore, when parting line 13 is on reflection surface 12 of the ultrasonic signals located on flow path bottom surface 5, which is the second surface, the ultrasonic signals are diffusely reflected by a burr formed on parting line 13, and a shape of the received waveform is unstable. This causes an error in the flow rate measurement.

The present exemplary embodiment provides a measurement flow path that can be integrally molded while avoiding the shapes that cause an error in the flow rate measurement described in the above conventional examples, and a specific configuration will be described below.

FIG. 3 illustrates a cross section of the flow path when molds are pulled out from both flow path inlet 10 and flow path outlet 11 to mold the inside at the time of molding the measurement flow path 1, and drafts are provided on flow path upper surface 4, which is the first surface, and flow path bottom surface 5, which is the second surface. In the present exemplary embodiment, drafts of surfaces perpendicular to partition plate 8, that is, the drafts of flow path upper surface 4 and flow path bottom surface 5 are dealt with in particular. Note that an actual draft of a mold is about 0.3°, and in the drawings, the drafts are emphasized so that the drafts can be visually recognized.

FIG. 4 is a cross-sectional view illustrating only measurement flow path 1 and the molds for molding the inside of measurement flow path 1. As illustrated in the drawing, mold 14a inserted from flow path inlet 10 and mold 14b inserted from flow path outlet 11 are in contact with each other at parting line 13 at the time of molding. After measurement flow path 1 is molded, mold 14a is pulled out from flow path inlet 10 in direction D1, and mold 14b is pulled out from flow path outlet 11 in direction D2. Note that parting line 13 is provided on a downstream side of reflection surface 12 of ultrasonic waves.

Flow path upper surface 4, which is the first surface, has drafts having same angle α with respect to center line A on a side of flow path inlet 10 and a side of flow path outlet 11, and lengths of propagation paths of the ultrasonic signals of ultrasonic sensors 2a, 2b and lengths of parts of the propagation paths affected by the flow of the fluid to be measured are made equal at any positions on the radiation surfaces.

Flow path bottom surface 5, which is the second surface, has a draft with angle β with respect to center line A on the side of flow path inlet 10 and a draft with angle γ with respect to center line A on the side of flow path outlet 11.

Angle β and angle γ do not necessarily have to be the same. Furthermore, reflection surface 12 of the ultrasonic signals of ultrasonic sensors 2a, 2b avoids having a draft, and angles formed by reflection surface 12 and the radiation surfaces of ultrasonic sensors 2a, 2b are both the same value, θ. In other words, the incident angles of the ultrasonic signals transmitted from the pair of ultrasonic sensors 2a, 2b on reflection surface 12 are both the same value, θ.

With the above configuration, even when measurement flow path 1 is integrally molded, the lengths of the propagation paths of the ultrasonic signals of ultrasonic sensors 2a, 2b and the lengths of the parts of the propagation paths affected by the flow of the fluid to be measured are made equal at any positions on radiation surfaces 9a, 9b, and there is no parting line, which causes diffuse reflection, on reflection surface 12, so that the received waveform is stable, and the flow rate can be measured with high accuracy.

Second Exemplary Embodiment

An ultrasonic flowmeter according to a second exemplary embodiment has a configuration similar to that in FIG. 1 described in the first exemplary embodiment, and the shape of measurement flow path 1 is different from that in the first exemplary embodiment.

Figure 5:
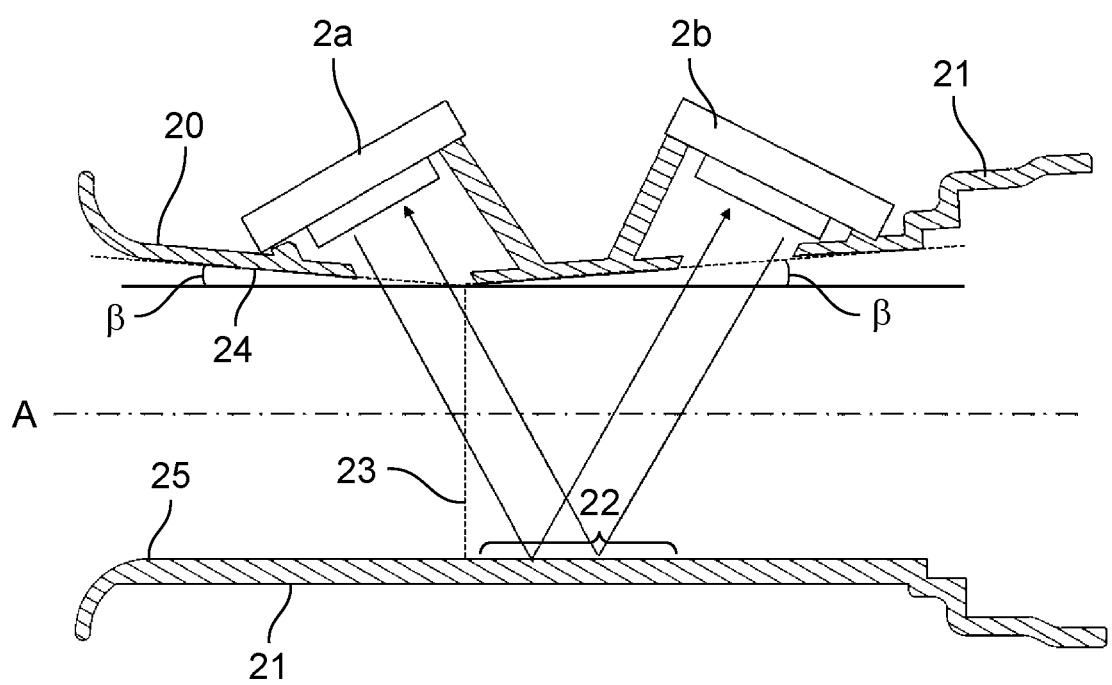
FIG. 5 is a cross-sectional view of main components of an ultrasonic flowmeter according to the second exemplary embodiment.

FIG. 5 illustrates a cross-sectional view of the measurement flow path of the ultrasonic flowmeter according to the second exemplary embodiment, and drafts are provided only on a flow path upper surface.

Figure 6:
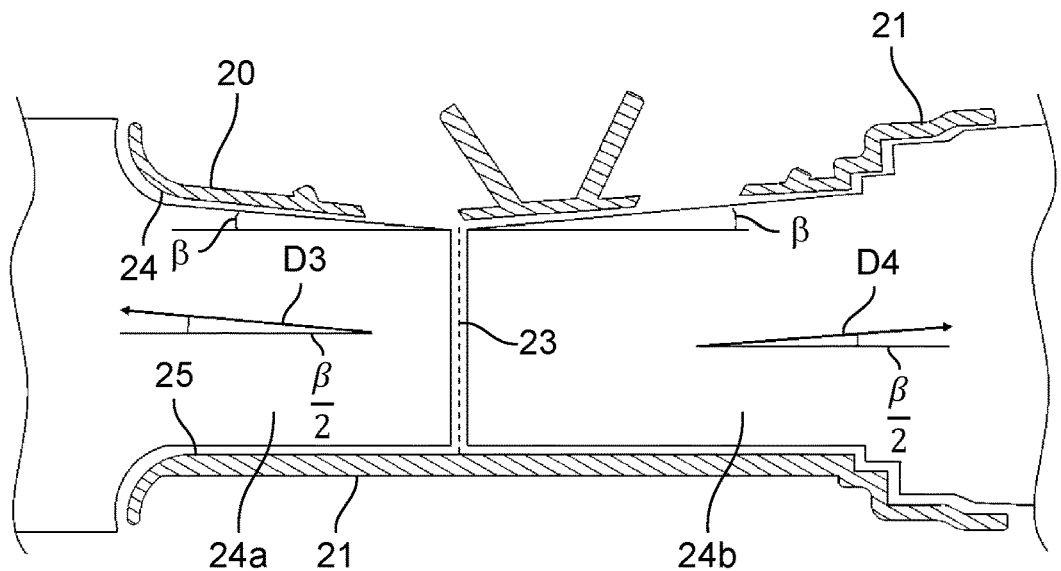
FIG. 6 is a cross-sectional view of a measurement flow path of the ultrasonic flowmeter according to the second exemplary embodiment when molds are inserted.
Figure 7:
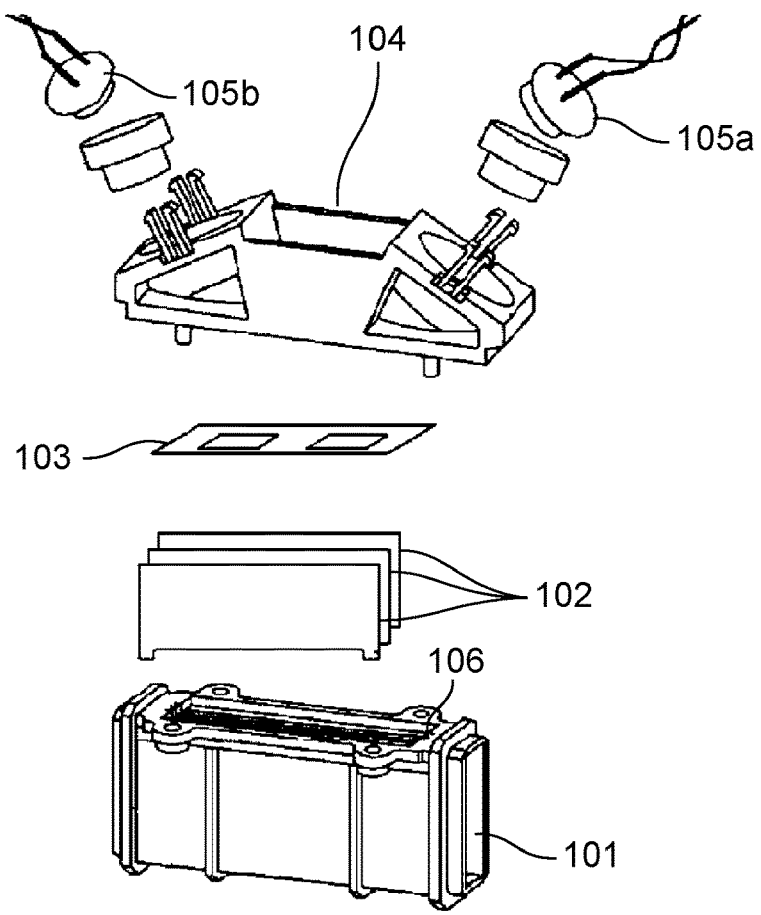
FIG. 7 is a configuration diagram of a conventional ultrasonic flowmeter.
Figure 8:
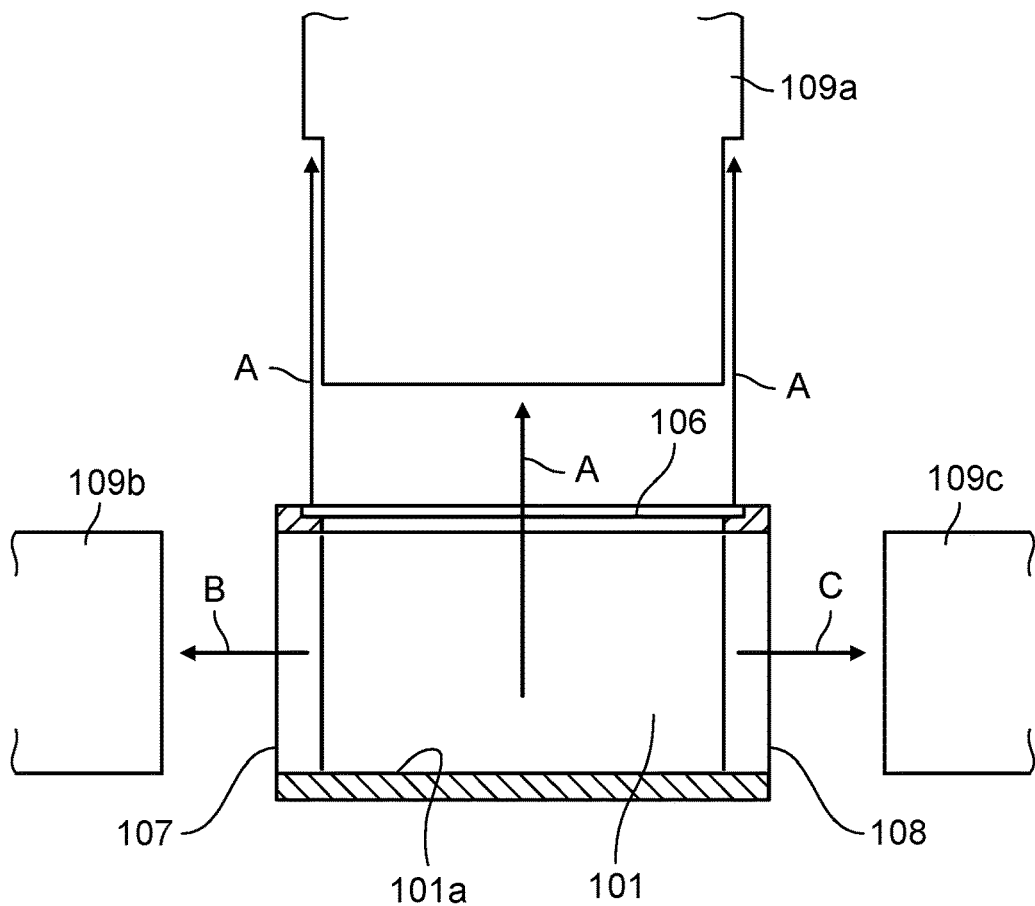
FIG. 8 is a mold configuration diagram at the time of molding a measurement flow path of the conventional ultrasonic flowmeter.
Figure 9:
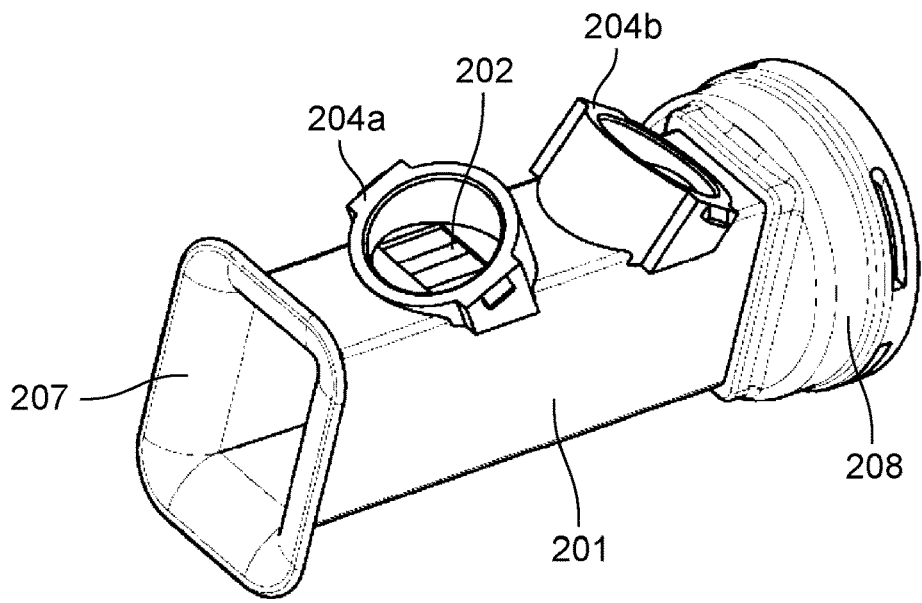
FIG. 9 is a perspective view of an integrally-molded measurement flow path of a conventional ultrasonic flowmeter.
Figure 10:
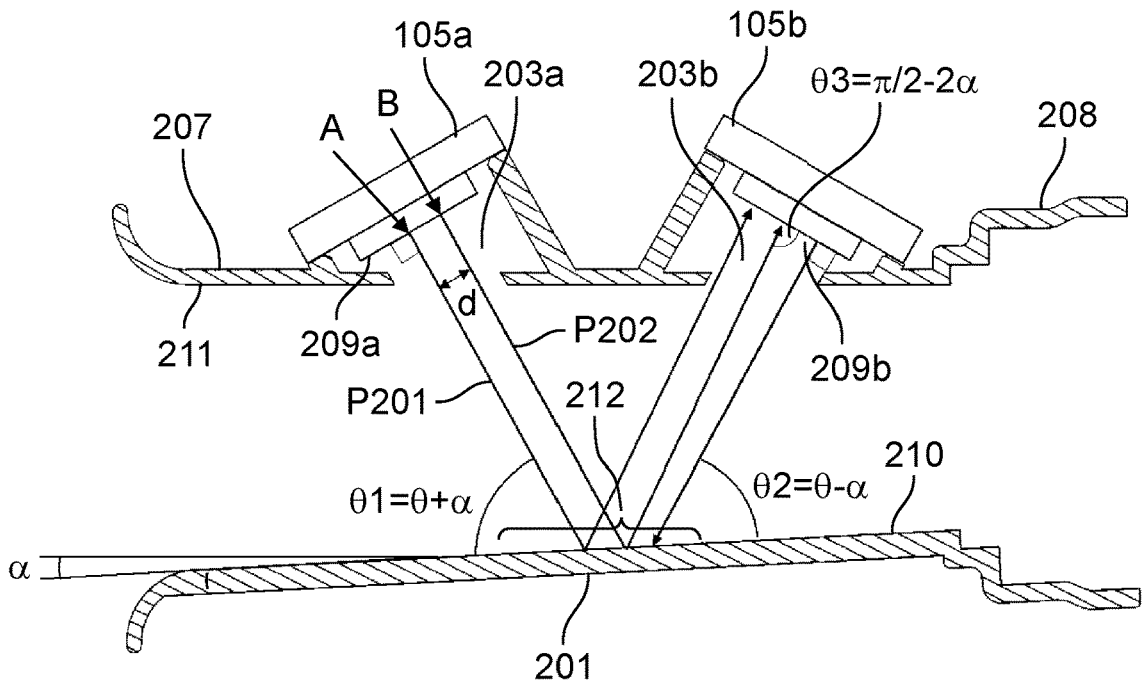
FIG. 10 is a cross-sectional view of an integrally-molded measurement flow path of a conventional ultrasonic flowmeter when a bottom surface has a gradient.
Figure 11:
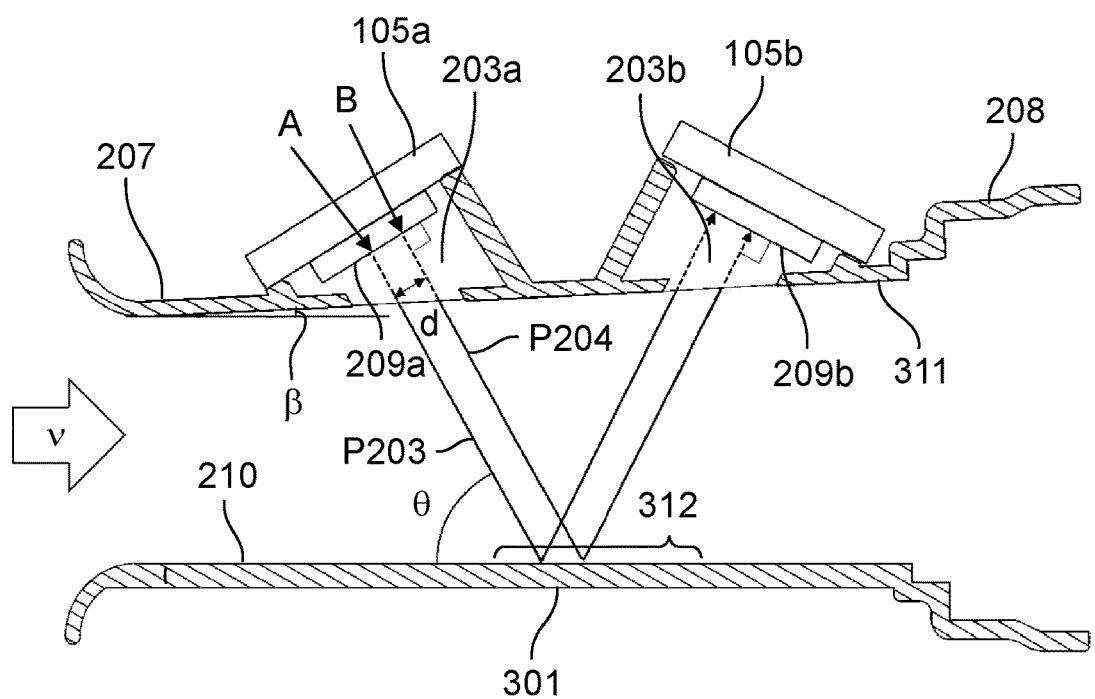
FIG. 11 is a cross-sectional view of an integrally-molded measurement flow path of a conventional ultrasonic flowmeter when an upper surface has a gradient.
Figure 12:
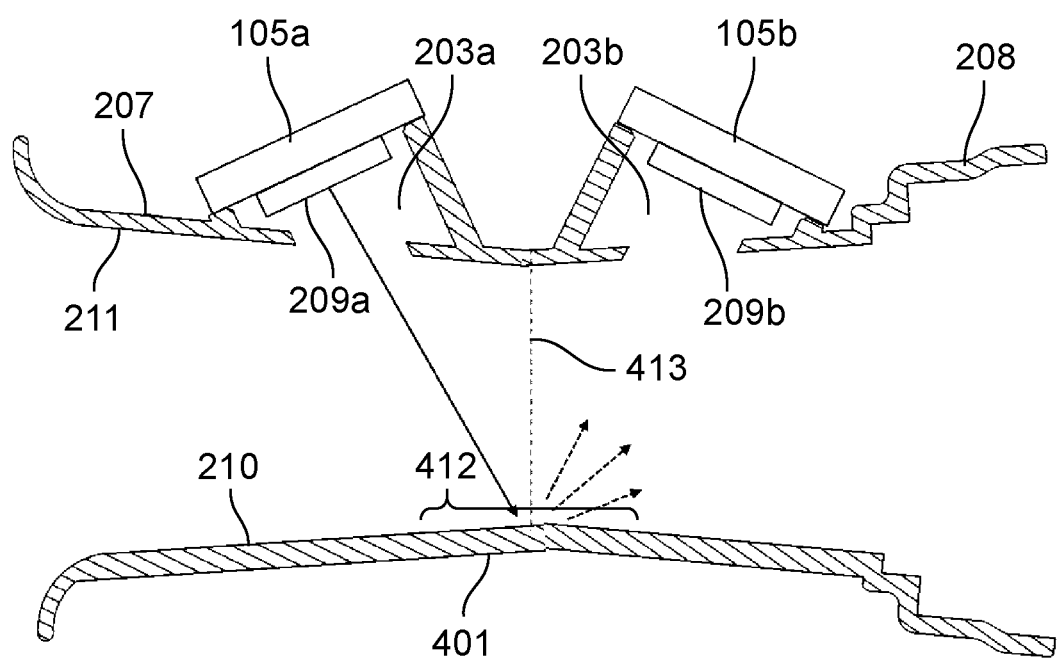
FIG. 12 is a cross-sectional view of an integrally molded measurement flow path of a conventional ultrasonic flowmeter when a parting line is on a reflection surface of ultrasonic signals.

FIG. 6 is a cross-sectional view illustrating only measurement flow path 21 and molds for molding the inside of measurement flow path 21. As illustrated in the drawing, mold 24a inserted from flow path inlet 20 and mold 24b inserted from flow path outlet 21 are in contact with each other at parting line 23 at the time of molding. After molding measurement flow path 21, mold 24a is pulled out from flow path inlet 20 in direction D3, and mold 24b is pulled out from flow path outlet 21 in direction D4. Note that parting line 23 is provided on an upstream side of reflection surface 22 of ultrasonic waves to avoid reflection surface 22, which is a region where ultrasonic signals are reflected.

Flow path bottom surface 25, which is a second surface, forms one plane parallel to center line A by molds 24a, 24b, and angles formed by flow path bottom surface 25 and radiation surfaces of ultrasonic sensors 2a, 2b are equal. Flow path upper surface 24, which is a first surface, has drafts with angle β with respect to center line A on a side of flow path inlet 20 and a side of flow path outlet 21. Molds 24a, 24b are pulled out in directions D3, D4 tilted toward a side of flow path upper surface 24 by angle β/2 with respect to flow path bottom surface 25.

As a result, flat reflection surface 22 can be formed wider on flow path bottom surface 25, which is the second surface. When a fluid to be measured is flowing in a forward flow, a position where the ultrasonic signals are reflected shifts to the side of flow path outlet 21, which is a downstream side, and parting line 23 is on the side of flow path inlet 10, which is an upstream side of reflection surface 22, and thus, a diffuse reflection of the ultrasonic signals at parting line 23 hardly occurs. As a result, a received waveform is more stable and a flow rate can be measured with high accuracy.

Note that an actual draft of a mold is about 0.3°, and in the drawings, the drafts are emphasized so that the drafts can be visually recognized.

With the above configuration, as in the first exemplary embodiment, even when measurement flow path 21 is integrally molded, lengths of propagation paths of ultrasonic signals of ultrasonic sensors 2a, 2b and lengths of parts of the propagation paths affected by a flow of the fluid to be measured are made equal at any positions on the radiation surfaces, and there is no parting line 23, which causes the diffuse reflection, on reflection surface 22, so that the received waveform is stable, and the flow rate can be measured with high accuracy.

As described above, an ultrasonic flowmeter in a first disclosure includes a measurement flow path through which a fluid to be measured flows, the measurement flow path including a first surface, a second surface facing the first surface, and a third surface and a fourth surface laid between the first surface and the second surface to form a rectangular cross section. In addition, the ultrasonic flowmeter includes a pair of ultrasonic sensors that are arranged upstream and downstream on the first surface of the measurement flow path and capable of transmitting and receiving ultrasonic signals, and openings that are provided on the first surface for the pair of ultrasonic sensors to transmit and receive the ultrasonic signals. Furthermore, the ultrasonic flowmeter includes a flow rate calculator that detects a flow rate of the fluid to be measured based on a propagation time until ultrasonic signals transmitted from one of the pair of ultrasonic sensors propagate through the fluid to be measured with at least one reflection on the second surface of the measurement flow path, and are received by another one of the pair of ultrasonic sensors. Furthermore, the measurement flow path has an inner wall surface provided with a draft of a mold for integral molding, and the pair of ultrasonic sensors are fixed to the measurement flow path, incident angles of ultrasonic signals transmitted from the pair of the ultrasonic sensors on a reflection surface of the second surface where the ultrasonic signals are reflected being equal.

This configuration prevents the length of a propagation path through which radiated ultrasonic signals pass from changing depending on a position on radiation surfaces of the ultrasonic sensors, and a phase of a received waveform at each position on the radiation surfaces of the ultrasonic sensors is matched with each other, so that the received waveform is stable and a flow rate can be measured with high accuracy.

In an ultrasonic flowmeter in a second disclosure, particularly in the first disclosure, the measurement flow path may be molded by molds being pulled out from a flow path inlet and a flow path outlet, and a pulling direction of each of the molds pulled out from the flow path inlet or the flow path outlet may be tilted with respect to the reflection surface.

With this configuration, on the second surface of the measurement flow path, a portion that maintains the same incident angle with respect to the pair of ultrasonic sensors can be made wider, so that the received waveform is more stable, and the flow rate can be measured with high accuracy.

In an ultrasonic flowmeter in a third disclosure, particularly in the first disclosure, the openings include the two openings provided on the first surface, and each of the two openings may have angles both parallel to the reflection surface or tilted in opposite directions.

This configuration prevents the length of a propagation path in the fluid to be measured, through which the radiated ultrasonic signals pass, from changing depending on the position on the radiation surfaces of the ultrasonic sensors, and the phase of the received waveform at each position on the radiation surfaces of the ultrasonic sensors is matched with each other, so that the received waveform is stable and the flow rate can be measured with high accuracy.

In an ultrasonic flowmeter in a fourth disclosure, particularly in the second disclosure, the openings include the two openings provided on the first surface, and each of the two openings may have angles both parallel to the reflection surface or tilted in opposite directions.

This configuration prevents the length of a propagation path in the fluid to be measured, through which the radiated ultrasonic signals pass, from changing depending on the position on the radiation surfaces of the ultrasonic sensors, and the phase of the received waveform at each position on the radiation surfaces of the ultrasonic sensors is matched with each other, so that the received waveform is stable and the flow rate can be measured with high accuracy.

An ultrasonic flowmeter in a fifth disclosure, particularly in any one of the first to third disclosures, the measurement flow path may have a parting line of molds inside the measurement flow path, and the parting line may be located at a position deviating from the reflection surface.

With this configuration, the ultrasonic signals can be prevented from being diffusely reflected at the parting line, so that the received waveform is stable and the flow rate can be measured with high accuracy.

INDUSTRIAL APPLICABILITY

As described above, in an ultrasonic flowmeter according to the present invention, since a measurement flow path can be integrally molded, it is possible to prevent a received waveform from being unstable due to overlap of ultrasonic signals in a state where phases of the ultrasonic signals are not matched, and to measure a flow rate with high accuracy, while costs of components conventionally incurred are reduced. Thus, the ultrasonic flowmeter according to the present invention can also be applied to applications such as gas meters.

REFERENCE MARKS IN THE DRAWINGS 1, 21 measurement flow path
2a, 2b ultrasonic sensor
3a, 3b mounting portion
4, 24 flow path upper surface (first surface)
5, 25 flow path bottom surface (second surface)
6a, 6b opening
7 flow rate calculator
9a, 9b radiation surface
10, 20 flow path inlet
11, 21 flow path outlet
12, 22 reflection surface
13, 23 parting line
14a, 14b, 24a, 24b mold
15 side surface (third surface)
16 side surface (fourth surface)

The invention claimed is:

1. An ultrasonic flowmeter comprising:
a measurement flow path through which a fluid to be measured flows, the measurement flow path including a first surface, a second surface facing the first surface, and a third surface and a fourth surface laid between the first surface and the second surface to form a rectangular cross section, the measurement flow path further including a center line, a flow path inlet, and a flow path outlet;
a pair of ultrasonic sensors fixedly mounted on mounting portions that are integrally molded with the measurement flow path and are arranged upstream and downstream on the first surface of the measurement flow path, the pair of ultrasonic sensors being capable of transmitting and receiving ultrasonic signals;
openings that are provided on the first surface for the pair of ultrasonic sensors to transmit and receive the ultrasonic signals; and
a flow rate calculator that detects a flow rate of the fluid to be measured based on a propagation time until ultrasonic signals transmitted from one of the pair of ultrasonic sensors propagate through the fluid to be measured with at least one reflection on the second surface of the measurement flow path, and are received by another one of the pair of ultrasonic sensors, wherein
the first surface is an upper surface of the measurement flow path,
the second surface is a lower surface of the measurement flow path, the lower surface facing the upper surface,
the first surface of the measurement flow path includes: a tilted surface located on a side of the flow path inlet, the tilted surface being tilted with respect to the center line, extending upward towards the flow path inlet, and having one of the openings; and a tilted surface located on a side of the flow path outlet, the tilted surface being tilted with respect to the center line, extending upward towards the flow path outlet, and having another of the openings,
the second surface of the measurement flow path includes a reflection surface where ultrasonic signals are reflected, the reflection surface being parallel to the center line, and
the pair of ultrasonic sensors are fixed to the measurement flow path such that incident angles of ultrasonic signals transmitted from the pair of ultrasonic sensors on the reflection surface are equal.

2. The ultrasonic flowmeter according to claim 1, wherein the measurement flow path is molded by molds being pulled out from the flow path inlet and the flow path outlet, and a pulling direction of each of the molds pulled out from the flow path inlet and the flow path outlet is tilted with respect to the reflection surface.

3. The ultrasonic flowmeter according to claim 2, wherein the openings include two openings provided on the first surface, and the two openings are tilted in opposite directions with respect to the reflection surface.

4. The ultrasonic flowmeter according to claim 3, wherein
the measurement flow path has a parting line of molds inside the measurement flow path, and the parting line is located at a position deviating from the reflection surface.

5. The ultrasonic flowmeter according to claim 2, wherein
the measurement flow path has a parting line of molds inside the measurement flow path, and the parting line is located at a position deviating from the reflection surface.

6. The ultrasonic flowmeter according to claim 1, wherein the openings include two openings provided on the first surface, and the two openings are tilted in opposite directions with respect to the reflection surface.

7. The ultrasonic flowmeter according to claim 6, wherein
the measurement flow path has a parting line of molds inside the measurement flow path, and the parting line is located at a position deviating from the reflection surface.

8. The ultrasonic flowmeter according to claim 1, wherein the measurement flow path has a parting line of molds inside the measurement flow path, and the parting line is located at a position deviating from the reflection surface.

* * * * *